April 26, 1938.   N. A. MILAS   2,115,206
METHOD OF MAKING ORGANIC PEROXIDES
Filed April 5, 1935
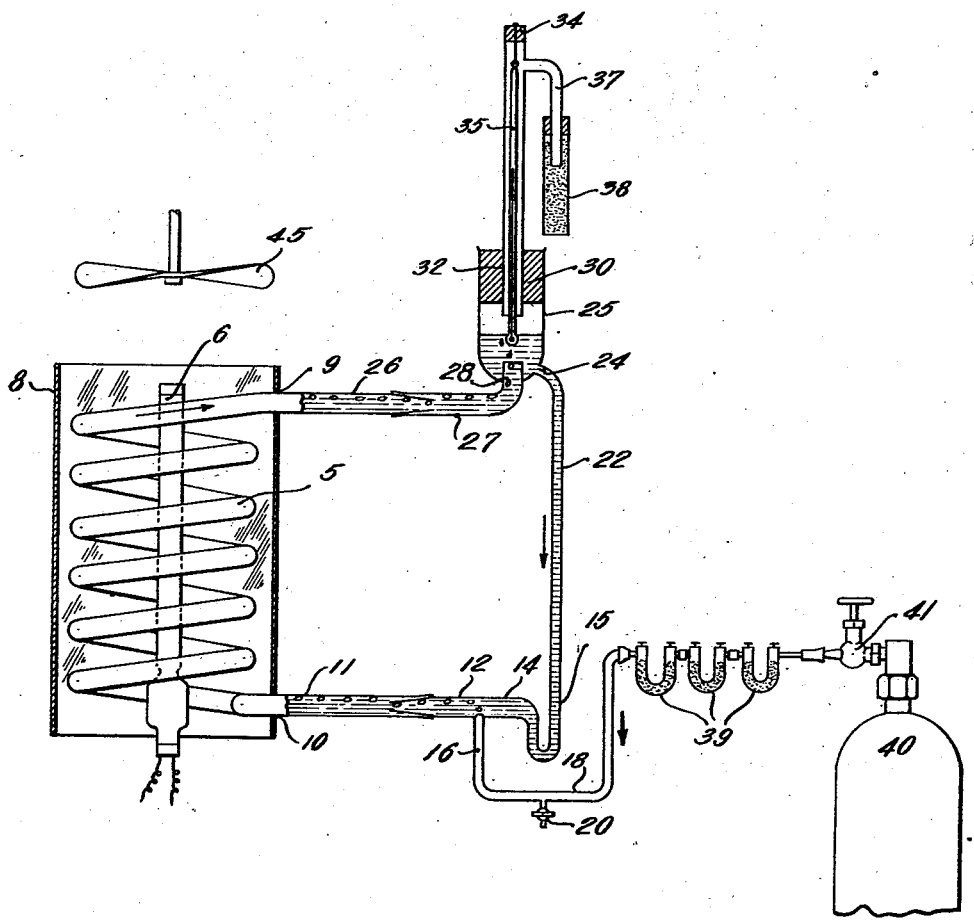
Inventor,
Nicholas A. Milas,
by Roberts, Cushman & Woodberry
Attys.

Patented Apr. 26, 1938

2,115,206

UNITED STATES PATENT OFFICE 2,115,206

METHOD OF MAKING ORGANIC PEROXIDES

Nicholas A. Milas, Cambridge, Mass.

Application April 5, 1935, Serial No. 14,787

21 Claims. (Cl. 260—16)

This invention relates to a process of producing organic peroxides and to the resulting products.

Although auto-oxidation is a well known and well recognized process, the end products thereof vary considerably in both chemical and physical characteristics, such auto-oxidation processes usually producing relatively non-reactive organic substances such as acids, aldehydes, ketones, etc. During the course of such auto-oxidation relatively unstable, highly reactive intermediate substances form, but under ordinary conditions these substances decompose rapidly; the amount present at any time during the process is very small and their isolation is relatively difficult. In the majority of auto-oxidation processes, knowledge of the presence of the intermediate products is based merely on theoretical considerations and, as far as I am aware, their isolation has not been accomplished except in a few limited cases as, for example, in the auto-oxidation of ethyl ether and of certain aldehydes such as acetaldehyde and benzaldehyde.

Although some workers have isolated the intermediate products of a few selected auto-oxidation reactions, they invariably used methods which involved refrigeration of the reaction mixture, and/or complete removal from the reactants of substances capable of reacting with or accelerating the decomposition of peroxides. Such processes are of limited applicability and can only be applied to substances such as aldehydes which readily undergo auto-oxidation even under ordinary conditions.

The auto-oxidation of alcohols is extremely slow under ordinary conditions as is shown by the fact that various alcohols remained substantially unchanged when in contact with air or oxygen for long periods of time. Hence, the rate of formation of the intermediate peroxides is very slow. Moreover, although their rate of decomposition is also slow, it is apparently as fast as, or faster than, their rate of formation, since the concentration of peroxides found under these ordinary conditions is negligible. However, I have found that the rate of formation of peroxides during the auto-oxidation of alcohols is considerably accelerated by ultra-violet light, while the rate of decomposition of these products is only slightly affected.

Since, under the joint influence of ultra-violet light and oxygen, peroxides are produced from alcohols at a much greater rate than that at which they decompose, it follows that, under these special conditions, high concentrations of peroxidic products can be reached, and since the original low rates of decomposition thereof are only slightly affected these peroxidic products are stable and can be easily isolated or obtained in relatively pure concentrates.

As previously pointed out, auto-oxidation under ordinary conditions occurs to such a slight extent that it is practically impossible to detect either such reactions or any products of such reactions, but as I am able greatly to increase the rate of formation of the peroxide without appreciably increasing its rate of decomposition I am able to produce substances which were heretofore unknown and which could not possibly be produced by any process heretofore known. Moreover, as the rate of decomposition of peroxidic products is relatively slow, the concentrated solutions and also the relatively pure substances are stable over moderate lengths of time, and, in fact, far more so than many of the stable organic peroxides now known.

Alcohol peroxides produced in accordance with the present invention are of value for all purposes for which the heretofore known peroxy compounds are now used, for example, germicides (both contact and vapor), fungicides, oxidizing agents, hemostats, etc., and by reason of their stability are of much greater value and utility.

The auto-oxidation of alcohols in accordance with the present invention differs from and is a marked advance over prior processes in that no refrigeration or other means of preventing the decomposition of the peroxides is required; in fact it is often advantageous, when carrying out the process, to employ temperatures above normal room temperature. Further advantages will be apparent from a consideration of the following description and the accompanying drawing, wherein The figure is a diagrammatic representation of an apparatus suitable for carrying out the auto-oxidation of alcohols in accordance with the present invention.

The term "alcohol" as hereinafter used designates that class of organic compounds containing one or more hydroxyl groups and which may be designated by such formulae as

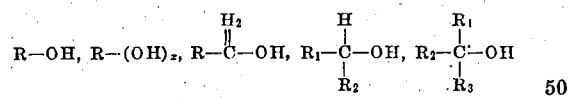

etc., wherein $R_1$, $R_2$, etc. represent different organic radicals.

In accordance with the present invention, the alcohol to be treated is subjected to ultra-violet irradiation in the presence of oxygen, air, or other oxygen-containing gas, the reaction preferably being carried out in a quartz vessel such as a flask, coil or the like. The time required to carry out the process may vary from a few minutes to several hours, or even days, depending upon the particular nature of the alcohol reacted upon. At the end of the process the unoxidized alcohol, the solvent or volatile medium, as the case may be, may be removed by vacuum distillation at low temperatures, and the peroxide in the residue may be separated by precipitation or fractionation under low pressures.

The auto-oxidation of a typical alcohol, for example, an alcohol having the general formula $$R-\overset{H_2}{\underset{}{C}}-OH$$

wherein R represents the organic radical, proceeds, in all probability, substantially as follows:

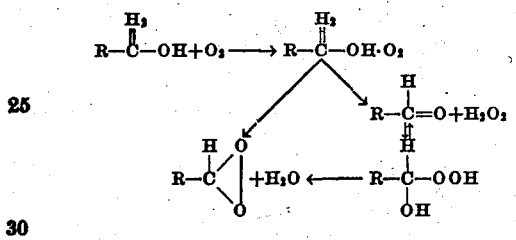

As a result of the ultra-violet irradiation in the presence of free oxygen, there is first obtained a reaction mixture in which there is a high degree of active oxygen as determined by titration, using acidified potassium iodide and standard thiosulfate solution. The initial peroxide formed in the reaction mixture, being a derivative of the alcohol $$R-\overset{H_2}{\underset{}{C}}-OH$$

is a peroxide of that alcohol and conforms in all probability to the general formula $$R-\overset{H_2}{\underset{}{C}}-OO-OH$$

The final reaction products in the mixture comprise alphahydroxy alkyl hydroperoxides, having the general formula $$R-\overset{H}{\underset{OH}{C}}-OOH$$

alpha alpha dihydroxy dialkyl peroxides, having the general formula $$R-\overset{H}{\underset{OH}{C}}-OO-\overset{H}{\underset{OH}{C}}-R'$$

and alkylidene peroxides or their polymers, having the general formulas

or

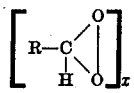

respectively.

It is well known that peroxides of the type

(alkylidine peroxides) polymerize very easily to form dimers, trimers, etc., in the following manner:

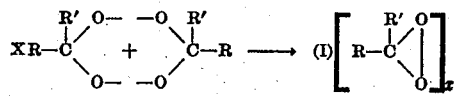

wherein (I) may be dimeric, as:

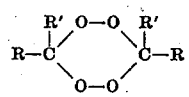

or trimeric, as

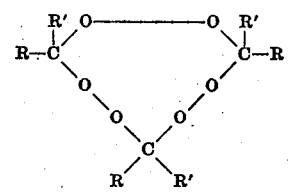

and so on.

The presence of the hydroxy peroxides and hydroperoxides is shown by the benzidene reaction of Woker, hereinafter referred to as the Woker reaction, (Woker, Zeit. Allg. Phsiol. 16, 340 (1914); Ber. 47, 1024 (1914); whereas that of the alkylidene peroxides is established by a quantitative analysis in accordance with the usual procedures for the identification of organic compounds.

To separate the alkylidene peroxide from the other products, I subject the final reaction mixture to vacuum distillation at or below room temperatures, thereby retaining it in the residue.

With secondary butyl alcohol (which is illustrative of a typical alcohol) the auto-oxidation proceeds, in all probability, as follows:

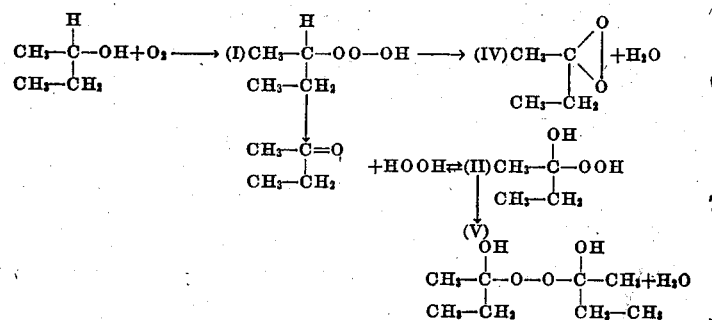

During the reaction a certain amount of the liberated hydrogen peroxide breaks down to produce water and as a result excess ketone is formed. This ketone may combine with the alpha hydroxy alkyl hydroperoxide to yield alpha dihydroxy, dialkyl peroxide, as shown in the following equation:

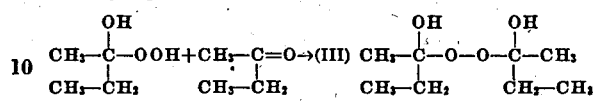

The initial peroxide (I) conforms, in all probability, to the formula

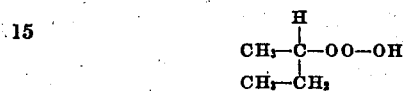

which may be expressed more generally by the formula

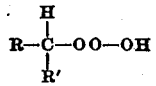

wherein R and R' are organic radicals. Two of the final reaction products in the mixture, as identified by the Woker reaction, comprise (II) an alpha hydroxy alkyl hydroperoxide, having the formula

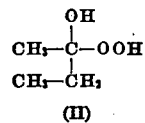

(II)

and (III) an alpha dihydroxy dialkyl peroxide, having the formula

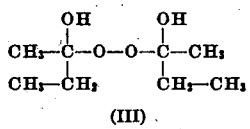

(III)

Another of the final products comprises (IV) an alkylidene peroxide or its polymer, having the formulas

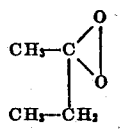

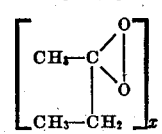

respectively. These peroxides may be isolated by subjecting the mixture to a high vacuum distillation when (II) and (III) are more volatile than (IV) which remains in the residue.

I have found that traces of water have a marked effect upon the rate of peroxide formation; accordingly, it is advisable that each alcohol be thoroughly dried. I have also found that the relative rates of peroxide formation during the irradiated auto-oxidation of impure alcohols do not necessarily conform to the relative rates of peroxidation of the same pure substances.

Furthermore, it is highly desirable, if not essential for satisfactory yields, that the alcohol be either in liquid phase, or in a solution or dispersion, so that it may be agitated or kept in motion during the reaction. With certain types of alcohols, such as triphenyl carbinol, benzhydrol, etc., it may be necessary to dissolve them in a low boiling point solvent which is resistant to peroxidation.

In the figure I have shown an apparatus particularly suitable for carrying out the auto-oxidation of alcohols in accordance with the present invention, it being understood that various other types of apparatus may be used such, for example, as a quartz flask disposed within a chamber containing an ultra-violet light, in which case the alcohol is exposed in a static system to an atmosphere of oxygen usually in a large excess. The particular apparatus herein shown comprises a quartz coil 5 circumposed about a Uviarc (ultra-violet) light 6 which is approximately six inches in length. A cylindrical reflector or shield 8 is disposed about the coil 5 and this shield is provided with openings 9 and 10 adjacent to its top and bottom edges, respectively, through which the ends of the coil extend.

The lower or inlet end 11 of the coil is connected preferably by a ground joint to one branch 12 of a T, another branch 14 of the T being connected to a U-tube or trap 15, and the lower branch 16 of the T being connected to a delivery tube 18 which is furnished with a tap 20. The U-tube 15 is connected by a return tube 22 to an outlet duct 24 located at the lower end of a cylindrical vessel 25 which is disposed at a higher level than the top of the coil 5, thus providing a collecting chamber. The upper or outlet end 26 of the coil is connected by a ground joint to a tube 27 which leads to the inlet duct 28 of the vessel 25. The top of the vessel is sealed by a plug 30 having a vertically extending bore in which the lower end of an air condenser 32 tightly fits. The top of the condenser 32 is sealed by a plug 34 from which is suspended a thermometer 35 which extends downwardly into the vessel 25 so that its bulb is at approximately the same level of the normal level of fluid therein. A vent pipe 37 leads off the condenser 32 and is connected to a moisture trap, here shown as a tube 38 containing calcium chloride.

The delivery tube 18 is connected to a chain of drying tubes 39 which are connected to a suitable oxygen supply, here shown as a tank 40 of compressed oxygen gas, the usual valve 41 being provided to control the flow of gas through the delivery tube 18. If desired, a fan 45 may be employed to circulate cool air about the light 6 and thus prevent overheating of the alcohol being auto-oxidized.

The various connections between the different parts of the apparatus should, of course, be leak proof and where such connections are not formed integral with the tubes, per se, (as by fusing the ends of glass tubing) or where ground joints are not used, suitable coupling members may be used, such couplings being of a material which will not react with or dissolve in an alcohol, or otherwise introduce any impurity into the system.

In using the apparatus above described 100 to 125 cc. of the alcohol to be auto-oxidized may be introduced into the coil 5 either through the delivery tube 18 or the vessel 25, the particular amount varying with the type of alcohol. The arc light 6 may then be struck and the valve 41 regulated so that a steady stream of dry oxygen is passed through the delivery tube 18 and into the coil 5. The rate of the flow of the oxygen through the alcohol within the coil is preferably of the order of 1.5 liters per hour, although a greater or less amount may be used. The small bubbles of oxygen passing through the coil 5 and into the vessel 25 and then out through the vent 37 are not only effective to keep the alcohol constantly agitated but also to maintain a steady circulation of the alcohol through the coil 5, vessel 25, tube 22 and back into coil 5, thus insuring a uniform irradiation and complete saturation of the alcohol with oxygen. Any alcohol which volatilizes is condensed by the condenser 32 and is returned to the vessel 25 where it is carried back into coil 5. The temperature of the alcohol during the reaction may be determined by the thermometer 35 and the particular temperature desired may be maintained by varying the speed and/or position of the fan 45.

During the reaction samples may be withdrawn through the tap 20 at intervals and analyzed for active oxygen in accordance with the procedure above set forth. As previously noted, the time during which the alcohol is to be subjected to irradiation will vary in accordance with the particular type used and the rate of reaction for any alcohol or any mixture of alcohols may be determined by titrating the samples withdrawn during the period of reaction. When the reaction has been carried to the desired point the irradiated product may be withdrawn from the apparatus, cooled and either stored for later use or distilled under vacuum to produce a concentrated solution, or a residue which, if desired, may be mixed with a suitable inert dilutent before use.

The following examples are illustrative of the invention:

*Example 1.—Isopropanol.*—125 cc. of isopropanol having a boiling point of 81.9–82.0° C., was irradiated, as above described, for a period of approximately 13.5 hours, the room temperature being 22° C. and that of the alcohol 40 to 45° C. At the end of the period the irradiation product was analyzed, as above described, and found to contain 0.60% active oxygen, corresponding to 2.8% alkylidene peroxide.

*Example 2.—Secondary butanol.*—125 cc. of secondary butanol, having a boiling point of 99.5° C., was irradiated, as above described, for a period of approximately 13 hours, the temperature of the alcohol and that of the room being 41 to 45° C. and 20° C., respectively. Analysis of the irradiated product showed 1.07% active oxygen, corresponding to 5.9% alkylidene peroxide.

*Example 3.—Normal butanol.*—120 cc. of normal butanol, having a boiling point of 117.6 to 117.8° C., was irradiated for a period of 19 hours, the temperature of the alcohol and that of the room being 40 to 43° C. and 22° C., respectively. Analysis of the irradiated product showed 0.042% active oxygen, corresponding to 0.25% alkylidene peroxide.

*Example 4.—Tertiary butanol.*—125 cc. of tertiary butanol, having a melting point of 25.3° C. and a boiling point of 82.3 to 82.5° C., was irradiated for a period of 48 hours, the temperature of the alcohol and that of the room being 42 to 45° C. and 22° C., respectively. Analysis of the irradiated product showed 0.068% active oxygen, corresponding to 0.45% alcohol peroxide ($RO_3H$).

*Example 5.—Isoamyl alcohol.*—120 cc. of isoamyl alcohol, having a boiling point of 130.1 to 130.4° C., was irradiated for a period of 23 hours, the temperature of the alcohol and that of the room being 40 to 44° C., and 20° C., respectively. Analysis of the irradiated product showed 0.035% active oxygen, corresponding to 0.23% alkylidene peroxide.

*Example 6.—Tertiary amyl alcohol.*—120 cc. of tertiary amyl alcohol, having a boiling point of 101.8 to 102.0° C., was irradiated for a period of 32 hours, the temperature of the alcohol and that of the room being 40 to 45° and 22° C., respectively. Analysis of the irradiated product showed 0.090% active oxygen, corresponding to 0.67% alcohol peroxide ($RO_3H$).

*Example 7.—Secondary amyl alcohol.*—125 cc. of secondary amyl alcohol, having a boiling point of 119.0 to 119.5° C., was irradiated for a period of 20 hours, the temperature of the alcohol and that of the room being 38 to 42° C. and 20° C., respectively. Analysis of the irradiated product showed 0.02% active oxygen, corresponding to 0.14% alkylidene peroxide.

*Example 8.—Cyclohexanol.*—This alcohol was first purified by extracting it with saturated sodium bisulfite until no more cyclohexanone was removed. It was then carefully dried, first with sodium sulfate and then with lime, after which it was fractionated, and the fraction boiling at 160.0 to 160.5° C. was removed and treated with 2% aqueous permanganate until no further reduction ensued. The cyclohexanol was then dried again over lime and refractionated. 116 cc. of the treated cyclohexanol was then irradiated for a period of 26 hours, the temperature of the alcohol and that of the room being 42 to 48° C. and 22° C., respectively. Analysis of the irradiated product showed 1.62% active oxygen, corresponding to 11.5% alkylidene peroxide.

*Example 9.—Benzyl alcohol.*—120 cc. of benzyl alcohol having a boiling point of 204.5° to 205.0° C., was irradiated for a period of 23.5 hours, the temperature of the alcohol and that of the room being 42 to 46° C. and 22° C., respectively. Analysis of the irradiated product showed 0.58% active oxygen, corresponding to 4.5% alkylidene peroxide.

*Example 10.—Phenylethyl alcohol.*—120 cc. of phenylethyl alcohol, having a boiling point of 202 to 203° C., was irradiated for a period of 18 hours, the temperature of the alcohol and that of the room being 40 to 44° C. and 21° C., respectively. Analysis of the irradiated product showed 0.040% active oxygen, corresponding to 0.35% alkylidene peroxide.

*Example 11.—Tetrahydrofurfuryl alcohol.*—120 cc. of tetrahydrofurfuryl alcohol, having a boiling point of 80 to 81° C. was irradiated for a period of 30 hours, the temperature of the alcohol and that of the room being 39 to 45° C. and 20° C., respectively. Analysis of the irradiated product showed 0.16% active oxygen, corresponding to 1.2% alkylidene peroxide.

*Example 12.—Triphenyl carbinol.*—A quantity of triphenyl carbinol, having a melting point of 162.0° C., was first dissolved in tertiary amyl alcohol and the solution was irradiated for a period of 25 hours, the temperature of the alcohol and that of the room being 42 to 46° C. and 22° C., respectively. Analysis showed 0.035% active oxygen, corresponding to 1.1% alcohol peroxide ($RO_3H$) in the irradiated triphenyl carbinol, these figures being derived by subtracting the calculated or estimated tertiary amyl alcohol peroxide from the total peroxide to give that due to the triphenyl carbinol peroxide.

*Example 13.—Benzhydrol.*—A quantity of benzhydrol having a melting point of 67.4° C. was first dissolved in tertiary amyl alcohol, as in Example 12, and the solution was irradiated for a period of 19 hours, the temperature of the alcohol and that of the room being 40 to 45° C. and 20° C., respectively. Analysis showed 0.15% active oxygen, corresponding to 0.85% alkylidene peroxide in the irradiated benzhydrol, these figures likewise being obtained as in Example 12.

*Example 14.—Methanol.*—100 cc. of methanol having a boiling point of 66° C., was exposed in a quartz flask to irradiation for a period of 40 hours, an atmosphere of oxygen being maintained within the flask. The temperature of both the atmosphere and alcohol under irradiation was maintained at 50° C. Analysis of the irradiated product showed 0.043% active oxygen, corresponding to 0.85% alkyledene peroxide.

*Example 15.—Ethanol.*—100 cc. of ethanol was subjected to irradiation under the same conditions as are set forth in Example 14 for a period of 80 hours. Analysis of the irradiated product showed 0.36% active oxygen, corresponding to 1.4% alkylidene peroxide.

*Example 16.—Normal propanol.*—100 cc. of normal propanol was subjected to irradiation for a period of 80 hours and under the same conditions as set forth in Examples 14 and 15. Analysis of the irradiated product showed 0.30% active oxygen, corresponding to 1.4% alkylidene peroxide.

*Example 17.—Monoethyl ether of ethylene glycol.*—120 cc. of monoethyl ether of ethylene glycol was subjected to irradiation for a period of 15.5 hours, the temperature of the alcohol and that of the room being 44 to 48° C. and 21° C., respectively. Analysis showed 0.43% active oxygen, corresponding to 2.8% alkyledene peroxide.

*Miscellaneous alcohols.*—Further applications of my process to various other alcohols have likewise produced relatively stable peroxides. The treatment of furfuryl alcohol (a primary heterocyclic alcohol), dodecyl alcohol (a further example of a primary aliphatic alcohol), menthol (a typical alcohol of the terpene series), and ethylene glycol (a typical polyhydric alcohol), in accordance with the above procedures has in each case produced peroxides having appreciable amounts of peroxidic products, thus affording a further confirmation of the fact that my process is applicable to alcohols as a class.

In each of the preceding examples the irradiation product was also tested for stability at 0° C. and at 20 to 23° C., and in all cases the peroxide was found to be relatively stable at these temperatures for moderate lengths of time.

The structure of the irradiated product may be determined in the manner shown in the following examples, which illustrate the procedure as applied to different types of representative alcohols:

*Example 18.*—A sample of isopropanol which has been irradiated for fourteen hours and contained 0.50% active oxygen was evaporated, first on a water pump and then overnight on an oil pump, producing a viscous residue. A weighted amount of this residue was transferred to a flask, then hydrolyzed with dilute sulfuric acid and the mixture distilled into a solution of 2,4 dinitrophenyl hydrazine in hydrochloric acid. The precipitate formed was washed, dried and recrystallized. The recrystallized precipitate showed a melting point of 126.5 to 127° C. against a melting point of 128° C. for acetone 2,4 dinitrophenyl hydrazone. Before recrystallization the precipitate was weighed and the amount of acetone formed was determined and found to be 77.5 against a theoretical of 78.4% for $C_3H_6O_2$.

Another portion of the residue was weighed into a flask and analyzed for active oxygen. The analysis showed 21.25% active oxygen against a theoretical of 21.6 for $C_3H_6O_2$, thus proving the presence of the alkyledene peroxide of acetone. The presence of isopropyl hydroxy hydroperoxide was shown by Woker's reaction.

*Example 19.*—A sample of the peroxide of secondary butyl alcohol was treated and tested in a manner similar to that described in Example 18 and an analysis of the residue showed 78% of methyl ethyl ketone against a theoretical of 81.8 for $C_4H_8O_2$, and 17.71% active oxygen against a theoretical of 18.18% for $C_4H_8O_2$, thus proving the presence of the alkyledene peroxide. The presence of alpha hydroxy alkyl peroxide was shown by a strong reaction with benzidene (Woker's reagent).

*Example 20.*—A sample of isoamyl alcohol which had been irradiated for twenty-five hours and contained 0.04% active oxygen was evaporated first on a water pump and then on an oil pump, nearly a week of continuous evacuation being necessary to remove all the solvent. A portion of the residue was weighed into a small flask and hydrolyzed with dilute sulfuric acid and the product was then distilled into a solution of 2,4-dinitro-phenyl hydrazine in hydrochloric acid. The precipitate was washed, dried and recrystallized. The recrystallized precipitate showed a melting point of 122 to 122.4° C. against a melting point of 123° C. for isovaleraldehyde 2,4-dinitro-phenyl hydrazone. The precipitate was weighed before purification and an amount of isovaleraldehyde formed was determined and found to be 82.4% against a theoretical of 84.6% for $C_5H_{11}O_2$.

Another portion of the residue was weighed into a flask and analyzed for active oxygen. The analysis showed 14.2% active oxygen against a theoretical of 15.4 for $C_5H_{11}O_2$, thus showing the presence of the alkyledene peroxide of isovaleraldehyde. In this case, as before, the original solution gave a positive Woker's reaction, showing the presence of a hydroxy hydroperoxide.

*Example 21.*—A sample of cyclohexanol which had been irradiated for twenty-six hours and contained 1.62% active oxygen was diluted with three times its volume of dry petroleum ether, and 5 grams of silica gel were then added. The solution was allowed to stand for one week with frequent shakings. A slow adsorption took place, and at the end of this time 21% of the peroxide had been adsorbed. The gel was then filtered off, washed with petroleum ether to remove adhering cyclohexanol, and extracted with cold chloroform. The chloroform solution was evaporated as before and the residue was hydrolyzed with dilute sulfuric acid, after which 2,4-dinitrophenyl hydrazine solution was added. The precipitate was then washed, dried and recrystallized. The melting point of the recrystallized precipitate was found to be 158° C. against 160° C. for cyclohexanone 2,4 dinitro-phenyl hydrazone. The amount of cyclohexanone formed was determined, as before, and found to be 85.8 against a theoretical of 86.2 for $C_6H_{11}O_2$.

The presence of active oxygen in the residue was determined as before and found to be 14.2 against a theoretical of 15.4 for $C_6H_{11}O_2$, thus showing the presence of alkyledene peroxide of cyclohexanone.

The present application is a continuation-in-part of my copending application Serial No. 589,977, filed January 30, 1932.

I claim:

1. The process of causing the production of peroxides by the irradiated auto-oxidation of relatively pure alcohols substantially free from water.

2. The process of causing the production of peroxide by the irradiated auto-oxidation of relatively pure monoethyl ether of ethylene glycol substantially free from water.

3. The process of causing the production of peroxides by the auto-oxidation of an alcohol having the general formula

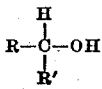

wherein R and R' are different hydrocarbon radicals, which comprises subjecting the relatively pure alcohol substantially free from water to ultra-violet irradiation in the presence of oxygen.

4. The process of causing the production of peroxides by the auto-oxidation of an alcohol having the general formula ROH, wherein R represents a hydrocarbon radical, which comprises subjecting the relatively pure alcohol substantially free from water to ultra-violet irradiation in the presence of oxygen.

5. The process of causing the production of peroxides by the auto-oxidation of an alcohol having the general formula ROH, wherein R represents a cyclic hydrocarbon radical, which comprises subjecting the relatively pure alcohol substantially free from water to ultra-violet irradiation in the presence of oxygen.

6. The process of causing the production of peroxides by the auto-oxidation of an alcohol having the general formula ROH, wherein R represents a hydro-aromatic hydrocarbon radical and in which the OH group is directly attached to the ring, which comprises subjecting the relatively pure alcohol substantially free from water to ultra-violet irradiation in the presence of oxygen.

7. The process of causing the production of peroxides by the irradiated auto-oxidation of relatively pure cyclohexanol substantially free from water.

8. The process of causing the production of peroxides by the irradiated auto-oxidation of relatively pure isopropanol substantially free from water.

9. Stable peroxides produced by the auto-oxidation of alcohols during the irradiation thereof by ultra-violet light.

10. A composition of matter containing an appreciable amount of peroxides having the general formulas

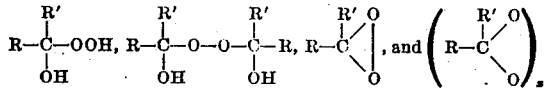

wherein R and R' represent hydrogen atoms or hydrocarbon radicals.

11. A composition of matter containing an appreciable amount of a peroxide having the general formula

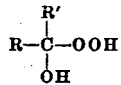

wherein R and R' represent hydrogen atoms or hydrocarbon radicals.

12. A composition of matter containing an appreciable amount of a peroxide having the general formula

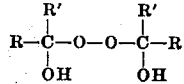

wherein R and R' represent hydrogen atoms or hydrocarbon radicals.

13. A composition of matter containing an appreciable amount of a peroxide having the general formula

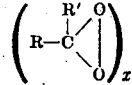

wherein R and R' represent hydrogen atoms or hydrocarbon radicals, and $x$ equals $1, 2, \ldots n$.

14. Peroxides produced by the irradiated auto-oxidation of cyclohexanol.

15. Peroxides produced by the irradiated auto-oxidation of isopropanol.

16. The process of making an alcohol peroxide, which comprises subjecting a relatively pure alcohol substantially free from water to ultra-violet irradiation in the presence of oxygen.

17. A relatively pure and stable organic peroxide consisting essentially of an irradiated auto-oxidized alcohol.

18. A relatively pure and stable organic peroxide consisting essentially of irradiated auto-oxidized cyclohexanol.

19. A relatively pure and stable organic peroxide consisting essentially of irradiated auto-oxidized isopropanol.

20. Peroxides produced by the irradiated auto-oxidation of monoethyl ether of ethylene glycol.

21. A relatively pure and stable organic peroxide consisting essentially of the irradiated auto-oxidized monoethyl ether of ethylene glycol.

NICHOLAS A. MILAS.